(12) United States Patent
Nagel et al.

(10) Patent No.: US 9,581,289 B2
(45) Date of Patent: Feb. 28, 2017

(54) MULTIPURPOSE ATTACHMENT SYSTEM AND METHODS FOR ATTACHMENT

(71) Applicant: Exmar Offshore Company, Houston, TX (US)

(72) Inventors: M. Ed Nagel, Houston, TX (US); Otto DaSilva, Houston, TX (US); Harris Knecht, Houston, TX (US)

(73) Assignee: Exmar Offshore Company, Houston, TX (US)

( * ) Notice: Subject to any disclaimer, the term of this patent is extended or adjusted under 35 U.S.C. 154(b) by 21 days.

(21) Appl. No.: 14/640,406

(22) Filed: Mar. 6, 2015

(65) Prior Publication Data

US 2015/0260334 A1 Sep. 17, 2015

Related U.S. Application Data

(60) Provisional application No. 62/114,833, filed on Feb. 11, 2015, provisional application No. 61/950,978, filed on Mar. 11, 2014.

(51) Int. Cl.
| | |
|---|---|
| *B63B 21/04* | (2006.01) |
| *F16M 13/02* | (2006.01) |
| *B63B 1/10* | (2006.01) |
| *B63B 3/08* | (2006.01) |
| *B63B 9/06* | (2006.01) |

(Continued)

(52) U.S. Cl.
CPC ............ *F16M 13/02* (2013.01); *B63B 1/107* (2013.01); *B63B 3/08* (2013.01); *B63B 3/48* (2013.01); *B63B 9/065* (2013.01); *B63B 21/56* (2013.01); *B63B 21/62* (2013.01); *B63B 35/34* (2013.01); *B63B 35/44* (2013.01); *B63B 35/4413* (2013.01); *B63B 43/14* (2013.01); *E21B 19/004* (2013.01); *B63B 2009/067* (2013.01);

(Continued)

(58) Field of Classification Search
CPC ................................. B63B 35/44; F16M 13/02
See application file for complete search history.

(56) References Cited

U.S. PATENT DOCUMENTS 3,651,778 A   3/1972 Derecktor
3,922,870 A * 12/1975 Recalde ................ B63B 35/03
                                                        16/267

(Continued)

FOREIGN PATENT DOCUMENTS

WO       2009135131 A2    11/2009

OTHER PUBLICATIONS

Search Report issued in European Application No. EP15158683; Dated Aug. 7, 2015 (8 pages).

(Continued)

*Primary Examiner* — Stephen Avila
(74) *Attorney, Agent, or Firm* — Osha Liang LLP (57) ABSTRACT

An attachment system for an offshore structure includes a porch configured to be affixed to the offshore structure, an adaptor configured to engage with one or more plates of the porch, and a latch to retain the adaptor into engagement with the one or more plates, in which the adaptor is configured to support an equipment device. A method of attaching equipment device to a structure includes affixing a porch of an attachment system to the structure, engaging an adaptor with one or more plates of the porch, and attaching an equipment device to the adaptor.

24 Claims, 10 Drawing Sheets

(51) Int. Cl.
    *B63B 21/56*    (2006.01)
    *B63B 35/44*    (2006.01)
    *B63B 43/14*    (2006.01)
    *E21B 19/00*    (2006.01)
    *B63B 3/48*     (2006.01)
    *B63B 21/62*    (2006.01)
    *B63B 35/34*    (2006.01)

(52) U.S. Cl.
    CPC ... *B63B 2021/563* (2013.01); *B63B 2035/442* (2013.01); *Y10T 29/49826* (2015.01)

(56) References Cited

U.S. PATENT DOCUMENTS 3,994,140 A * 11/1976 Gunderson ............. F16C 11/04
                                                    16/229
2008/0190346 A1    8/2008 Krehbiel et al.

OTHER PUBLICATIONS

Office Action issued in Korean Application No. 10-2015-0033558; Dated Nov. 9, 2016 (10 pages).

* cited by examiner

MULTIPURPOSE ATTACHMENT SYSTEM AND METHODS FOR ATTACHMENT

BACKGROUND OF THE DISCLOSURE

Field of the Disclosure

Embodiments disclosed herein generally relate to an attachment system. More specifically, embodiments disclosed herein relate to an attachment system for use in oilfield operations capable of attaching additional support and/or equipment.

Description of Related Art

In oilfield operations, offshore vessels, such as semi-submersibles ("semis") and platforms, are commonly used for various tasks, including, but not limited to, hydrocarbon exploration, hydrocarbon drilling and production, safety platforms, and heavy lift cranes. Before, during, and after operations, additional support and/or the use of additional equipment may be beneficial to the success of an operation. Historically, additional equipment and/or support may have been welded or bolted to a pre-existing structure. While traditional methods served their purpose, they were challenging, time consuming, and resource intensive. Additionally, when operational needs dictate expansion, retrofitting a pre-existing structure, such as a semi or a platform, with additional support may have required the used of many skilled workers, supporting devices, and many hours in order to attach (commonly done by welding), often underwater, such a support to the pre-existing structure.

Accordingly, it may be advantageous to both onshore and offshore oilfield operations to employ an attachment system capable of providing additional support when necessary that is easily installed on a pre-existing structure and is capable of connecting one or more devices, structures, and/or equipment to a structure or to one another.

SUMMARY OF THE DISCLOSURE

In general, in one aspect, the present disclosure relates to an attachment system for an offshore structure, the attachment system including a porch configured to be affixed to the offshore structure, an adaptor configured to engage with one or more plates of the porch, and a latch to retain the adaptor into engagement with the one or more plates, in which the adaptor is configured to support an equipment device.

In general, in another aspect, the present disclosure relates to a semisubmersible including a pontoon base having one or more support columns disposed thereon, the one or more support columns configured to support a deck, and an equipment device removably connected to an adaptor of an attachment system, in which the attachment system includes a porch configured to engage the adaptor.

In general, in yet another aspect, the present disclosure relates to a method of attaching an equipment device to a structure, the method including affixing a porch of an attachment system to the structure, engaging an adaptor with one or more plates of the porch, and attaching an equipment device to the adaptor.

Other aspects and advantages of the disclosure will be apparent from the following description and the appended claims.

DETAILED DESCRIPTION

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

Furthermore, those having ordinary skill in the art will appreciate that when describing a first element to a second element disposed thereon, it is understood that disposing may be either directly disposing the first element on the second element, or indirectly disposing the first element on the second element. For example, a first element may be directly disposed on a second element, such as by having the first element and the second element in direct contact with each other, or a first element may be indirectly disposed on a second element, such as by having a third element, and/or additional elements, disposed between the first and second elements.

In one aspect, embodiments disclosed herein generally relate to multiuse attachment systems. In one or more embodiments, the attachment systems may be designed for use with offshore structures, in particular, offshore floating vessels, such as semi-submersibles. In other embodiments, the attachment systems may be designed for use with onshore structures, such as oil derricks. Further, the attachment systems may be designed for use in any marine or land environment without departing from the scope of the present disclosure.

Figure 1A:
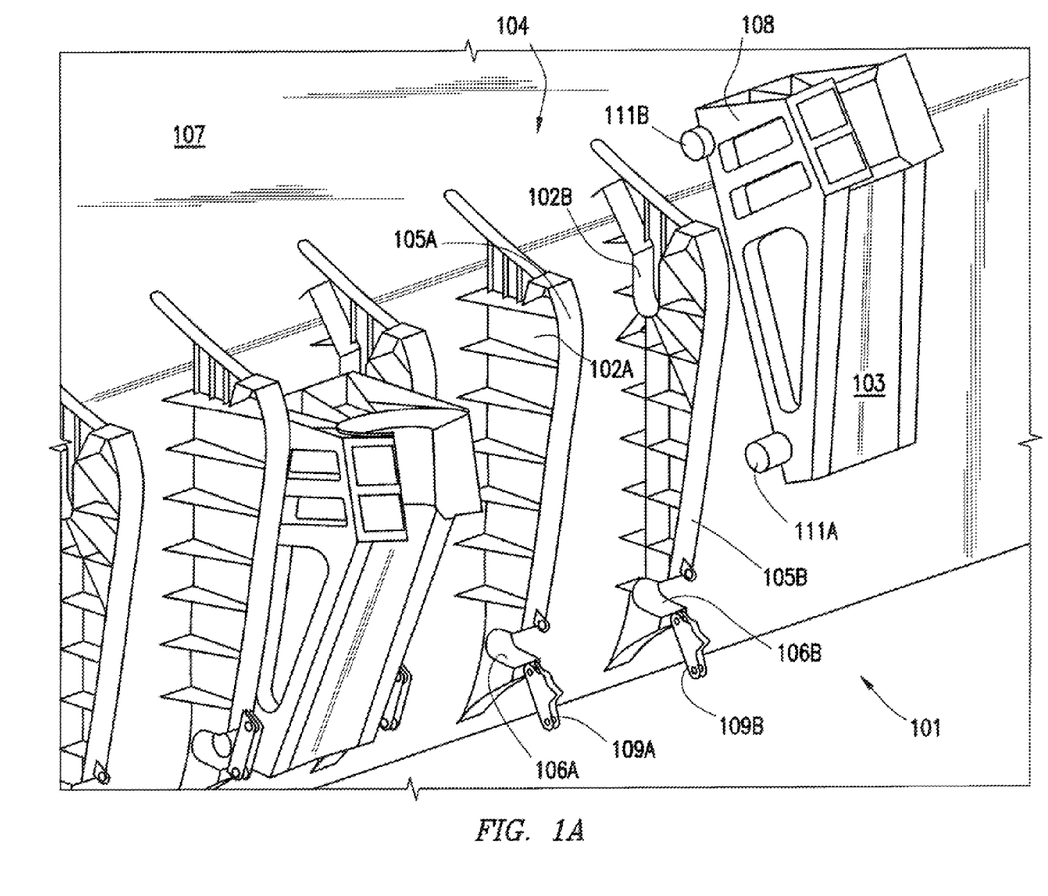
FIGS. 1A-1B show examples of an attachment system in accordance with one or more embodiments of the present disclosure.
Figure 1B:
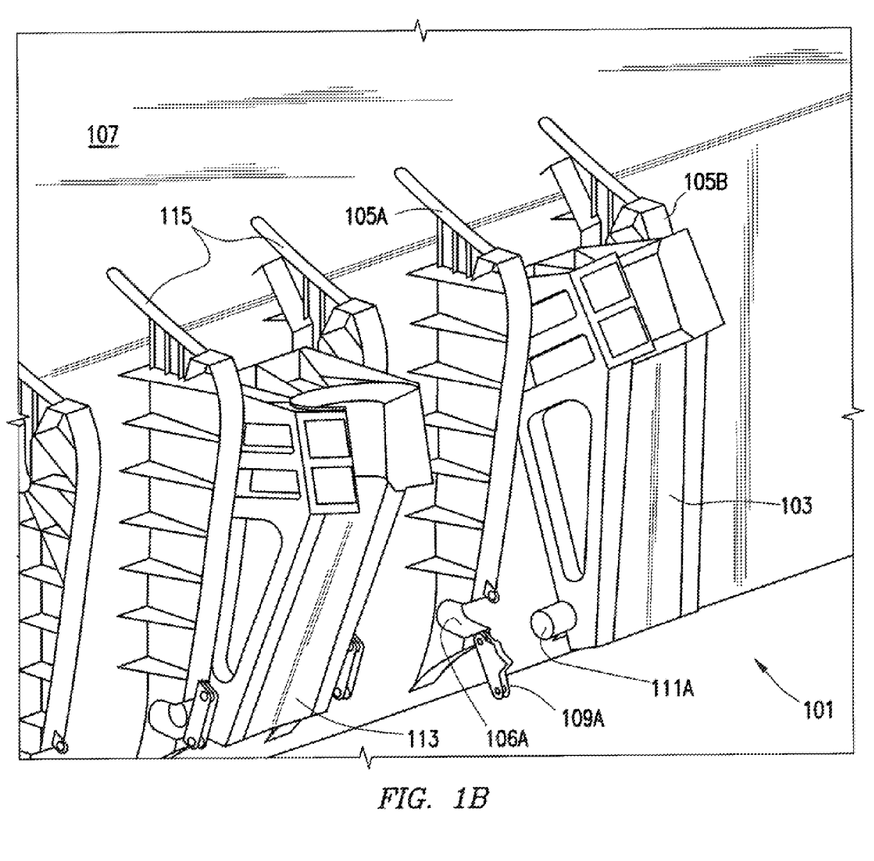

Referring to FIGS. 1A-1B, an attachment system 101 in accordance with one or more embodiments is shown. In FIG. 1A, the attachment system 101 includes an adaptor 103 capable of engaging and disengaging with a porch 104. As shown, the porch 104 may include two side plates 105A and 105B. However, one or ordinary skill would know and appreciate that the porch 104 may include any number of side plates or may include a plurality of plates connected to each another to form a single plate structure capable of housing and/or engaging with the adaptor 103. In addition, the two side plates 105A and 105B may comprise one or more structural elements, such as, for example, any one of or a combination of beams, trusses, panels, plates, brackets, braces, among many others known to those having ordinary skill in the art. Further, as shown, each of the two side plates 105A and 105B include lower sockets 106A and 106B as well as upper sockets 102A and 102B and latches 109A and 109B. Those having ordinary skill would appreciate that upper socket 102A is disposed on an interior face of side plate 105A, though the present disclosure is not so limited as any number of sockets and latches may be used and disposed on any of the adaptor 103 and side plates 105A and 105B.

In addition, the adaptor 103 may be provided with one or more adaptor elements, such as frame 108, and/or lugs, such as lower lugs 111A and upper lugs 111B, used to engage the adaptor 103 with the porch 104. Those having ordinary skill would appreciate that adaptor elements may include any other structural elements known in the art. As shown, the adaptor 103 includes a set of lower lugs 111A and a set of upper lugs 111B that protrude from an outer portion of the adaptor 103. The lower and upper sets of lugs 111A and 111B may be disposed on or along an outer portion or an inner portion of the adaptor 103 and/or may be disposed along a length or width of the adaptor 103. Further, the lower and upper sets of lugs 111A and 111B may be separate from or integral to the adaptor 103.

In one or more embodiments, the porch 104 and/or the side plates 105A and 105B may be configured to be affixed to a structure 107. The structure 107 may be a semisubmersible, a support column, a pontoon, a rig floor, and/or any other structure or component known in the art. The side plates 105A and 105B may be permanently or temporarily affixed to the structure by welding, bolting, and/or any other means or mechanism known in the art. The side plates 105A and 105B may also be a portion of or built into the structure 107. Further, the side plates 105A and 105B may be affixed to the structure 107 using one or more intermediary affixing devices (not shown), such as a bracket and/or a brace.

As shown in FIG. 1A, the adaptor 103 is disengaged from side plates 105A and 105B. However, as mentioned above, in one or more embodiments, the adaptor 103 may engage, partially or wholly, with the porch 104, as shown in FIG. 1B. The adaptor 103 may engage with the porch 104 by first engaging the set of upper lugs 111B with the upper sockets 102A and 102B and then rotating adaptor 103 such that the set of lower lugs 111A engage with lower sockets 106A and 106B. Once lower lugs 111A engage with lower sockets 106A and 106B, latches 109A and 109B may be closed in order to secure adaptor 103 in position within porch 104, as depicted by adaptor 113 and corresponding side plates 115.

Latches 109A and 109B may be configured to limit and/or prevent movement of the adaptor 103 with respect to the side plates 105A and 105B. Further, the engagement of the latches 109A and 109B with lower lugs 111A may provide additional support and/or stabilization of the adaptor with respect to the side plates 105A and 105B. In addition, clamps (not shown) or any other types of securing devices known in the art may be used to secure the adaptor 103 with respect to the side plates 105A and 105B. While the figures depict landing upper lugs 111B into upper sockets 102A and 102B first and then rotating adaptor 103 to engage lower lugs 111A into lower sockets 106A and 106B, a person having ordinary skill can appreciate that in alternative designs, lower lugs 111A may be landed into their respective sockets (e.g. 106A, 106B) first with adaptor 103 rotated to engage upper lugs 111B into their respective sockets. Additionally, one of ordinary skill would appreciate that latches 109A and 109B may be positioned about lower sockets 106A and 106B (as shown), latches may also be positioned about upper sockets 102A and 102B, or both sets of sockets.

The adaptor 103 may be configured to attach to equipment or other structures. Further, the particulars (e.g., the size and shape) of the adaptor may be customized and the customization may be specific to a given application or operation.

For attaching, one or more embodiments include affixing the porch 104 to the structure 107. The adaptor 103 may be connected to an equipment device. Thereafter, the adaptor 103 may engage with the porch 104 such that the side plates 105A and 105B align with the adaptor 103 while the lugs 111A and 111B engage with sockets 106A and 106B, or engage with an interior or exterior face of the porch 104 and/or side plates 105A and 105B. Further, the latches 109A and 109B may then be used to retain and/or secure the adaptor 103 in position relative to the porch 104 such that the equipment device is, in this example, indirectly attached to the structure 107.

Figure 2:
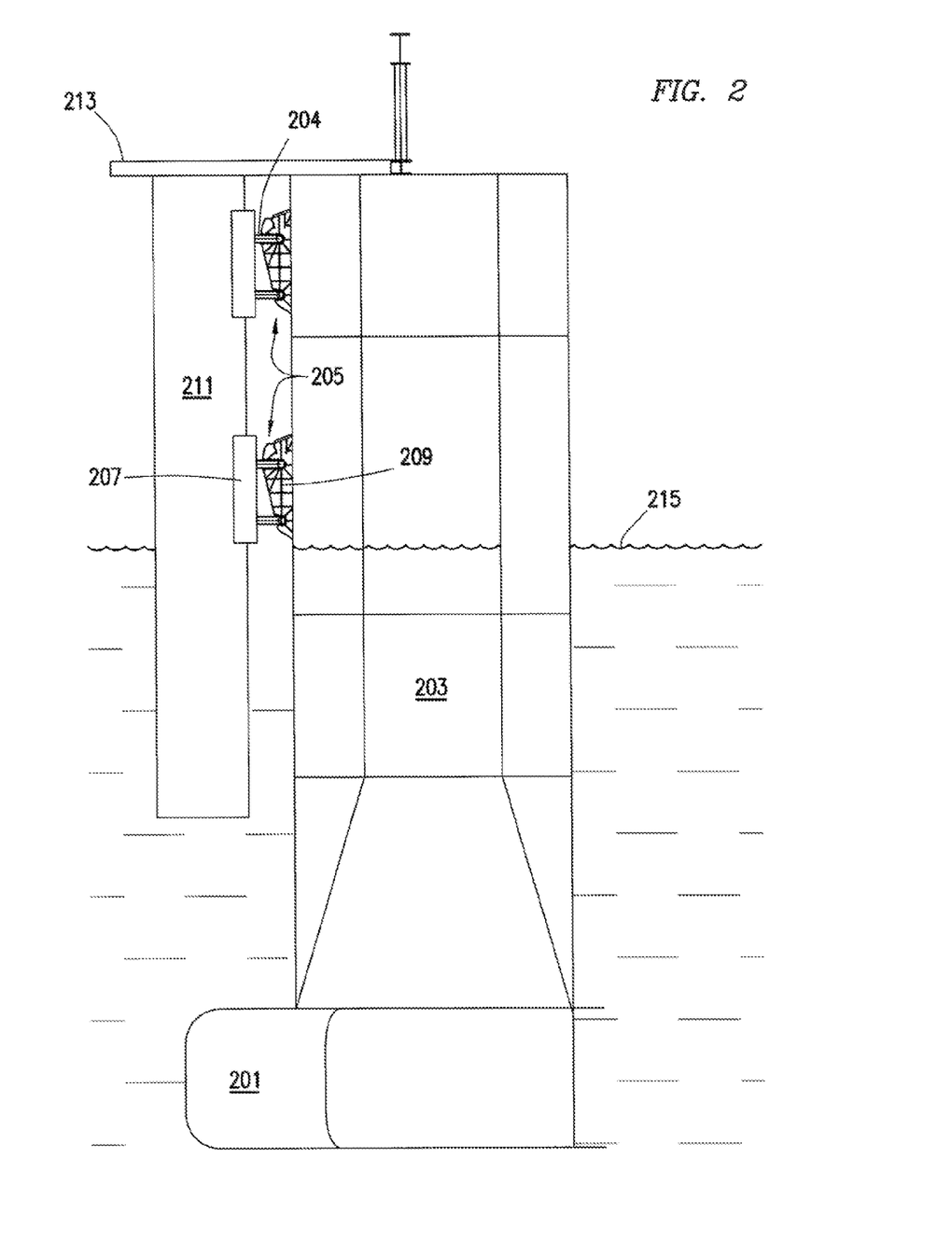
FIGS. 2-4 illustrate examples of attachment systems in accordance with one or more embodiments of the present disclosure.
Figure 3:
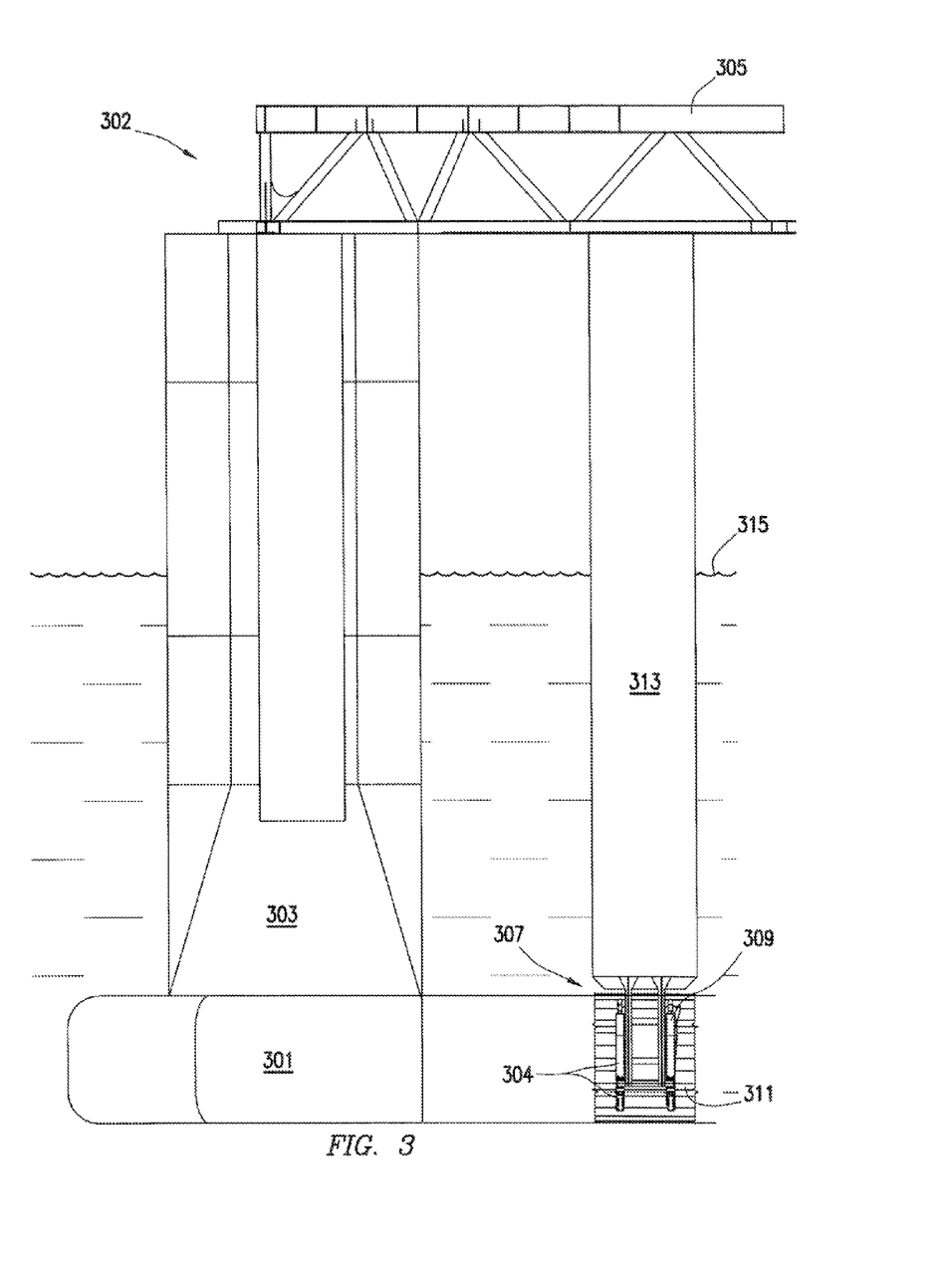
Figure 4:
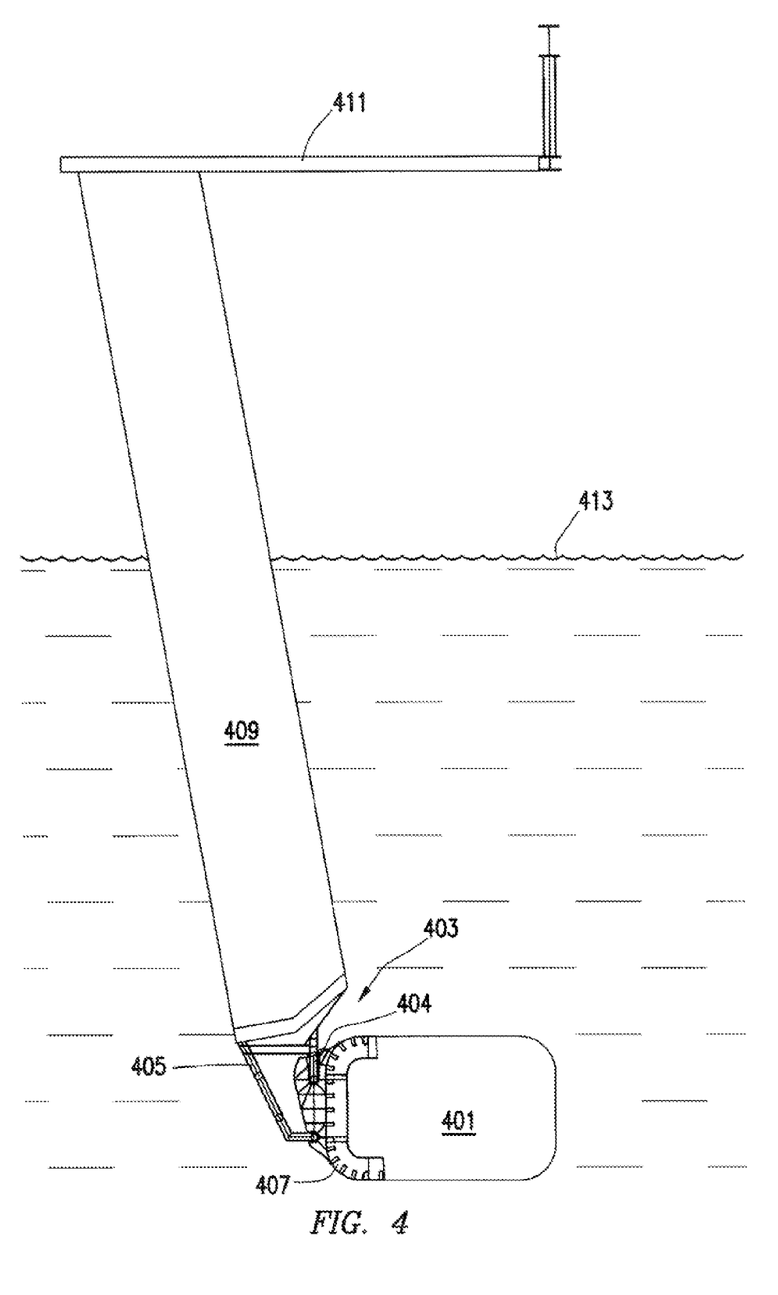

Additionally, for example, through the engagement of the adaptor 103 with the side plates 105A and 105B, any equipment or devices connected to the adaptor 103 may transfer weight to the structure via the adaptor 103 and side plates 105A and 105B. Accordingly, the attachment system 101 may be designed and/or configured to allow loads or transferred weight to be carried in any direction or specific directions along or through the structure 107 through the use of the adaptor 103 and the side plates 105A and 105B. The direction(s) in which loads are to be carried may be specific to the equipment connected to the adaptor 103 and/or may be specific to a particular application or operation. Referring now to FIGS. 2-4, one or more attachment systems in accordance with one or more embodiments are shown. In FIG. 2, a pontoon base 201 is shown having a support column 203 disposed thereon. Affixed to the support column 203 is at least one attachment system 205. In this example, two attachment systems are shown. However, one of ordinary skill would know and appreciate that any number of attachment systems may be affixed to the support column 203 and the number of attachment systems may depend on a type of application or operation.

Similar to FIGS. 1A-1B, the attachment system 205 includes at least one adaptor 207 and at least one porch 209. The adaptor 207 is configured to engage and disengage the porch 209. Furthermore, the adaptor 207 comprises one or more adaptor elements 204, such as a frame, lugs, or any other structural element known in the art. The adaptor elements 204 are configured to support additional equipment, in this case, a supporting structure 211 for an add-on deck 213. The supporting structure 211 may then be used to support a portion and/or an expansion of a deck 213 in order to provide additional stability or may support any other equipment known in the art.

As depicted in FIG. 2, in one or more embodiments, any of the pontoon base 201, support column 203, and supporting structure 211, may be positioned below water level 215. In addition, in some embodiments, one or more attachment systems, such as attachment system 205, may also be positioned below water level 215. In other embodiments, a plurality of attachments systems may be positioned along the length of support column 203 and are capable of operating in an environment both above and below water level 215. The position of the attachments system 205 along the support column 203 may depend on a given operation and thus, when one or more equipment devices are attached, weight may be transferred from the support structure 211 through the attachment system 205 to the support column 203, and may be done so effectively without the need for welding, if necessary.

In FIG. 3, a pontoon base 301 of a rig 302 is shown having a support column 303 disposed thereon. The pontoon base 301 may include any number of support columns disposed thereon making up a rig 302. The support column 303 may support a portion of deck 305. As shown, the pontoon base 301 may be positioned below water level 315. Similarly, a portion of the support column 303 may also be positioned below water level 315. Affixed to the pontoon base 301 is at least one attachment system 307. In this example, one attachment system 307 is shown. However, one of ordinary skill would know and appreciate that any number of attachment systems may be affixed to the pontoon base 301 and the number of attachment systems may depend on a type of application or operation.

Similar to FIGS. 1A-1B, the attachment system 307 includes at least one adaptor 309 and at least porch 311. The adaptor 309 is configured to engage and disengage the porch 311. Furthermore, the adaptor 309 includes one or more adaptor elements 304, such as a frame, lugs, or any other structural element known in the art. The adaptor elements 304 are configured to support additional equipment, in this case, a supporting structure 313. The supporting structure 313 may then be used to support a portion and/or an expansion of a deck 305 or may support any other equipment known in the art. For example, should it be determined that additional support is necessary for rig expansion or otherwise, the supporting structure 313 may be attached (as shown) to the rig 302 using the attachment system 307 to increase the load capacity of the deck 305 and ultimately, allow for additional equipment or structures to be added to the rig 302.

Though not shown in FIG. 3, in one or more embodiments, the adaptor 309 and the porch 311 may be designed to angle equipment in a particular direction. For example, when connected to adaptor 309, supporting structure 313 may be angled toward or away from pontoon base 311 in order to provide additional support in a specific region or portion of the deck 305. Alternatively, or in addition, supporting structure 313 may be angled with respect to a vertical axis in order to provide additional support in a specific region or portion of the deck. Further, supporting structure 313 may pivot with respect to pontoon base 311. Although the angling and pivoting of supporting structure 313 is described above, those having ordinary skill would know that supporting structure 313 is used herein for exemplary purposes and would that any equipment may also be capable of such angling and pivoting provided that the attachment system 307 is designed for such conditions.

In FIG. 4, a cross section of a pontoon base 401 is shown. The pontoon base 401 may be underwater. Affixed to the pontoon base 401 is at least one attachment system 403. In this example, one attachment system 403 is shown. However, one of ordinary skill would know and appreciate that any number of attachment systems may be affixed to the pontoon base 401 and the number of attachment systems may depend on a type of application or operation.

Similar to FIGS. 1A-1B, the attachment system 403 includes at least one adaptor 405 and at least a porch 407. The adaptor 405 is configured to engage and disengage the porch 407. Furthermore, the adaptor 405 includes one or more adaptor elements 404, such as a frame, lugs, or any other structural element known in the art. The adaptor elements 404 are configured to support additional equipment, in this case, a supporting structure 409. The supporting structure 409 may then be used to support a portion and/or an expansion of a deck 411 or may support any other equipment known in the art. In FIG. 4, the deck 411 is shown as an expansion supported by the additional supporting structure 409. As mentioned above, one or more of the adaptor 405, porch 407, supporting structure 409, and pontoon base 411, may be positioned partially or wholly below water level 413.

Similar to FIG. 3 above, in one or more embodiments, the adaptor 405 and the porch 407 may be designed to angle equipment in a particular direction. For example, when connected to adaptor 405, supporting structure 409 may be angled toward or away from pontoon base 409 in order to provide additional support in a specific region or portion of the deck 411, as shown. Similarly, if desirable, supporting structure 409 may be angled with respect to a vertical axis in order to provide additional support in a specific region or portion of the deck. Further, supporting structure 409 may pivot with respect to pontoon base 401. Although the angling and pivoting of supporting structure 409 is described above, those having ordinary skill would know that supporting structure 409 is used herein for exemplary purposes and would that any equipment may also be capable of such angling and pivoting provided that the attachment system 403 is designed for such conditions.

Figure 5A:
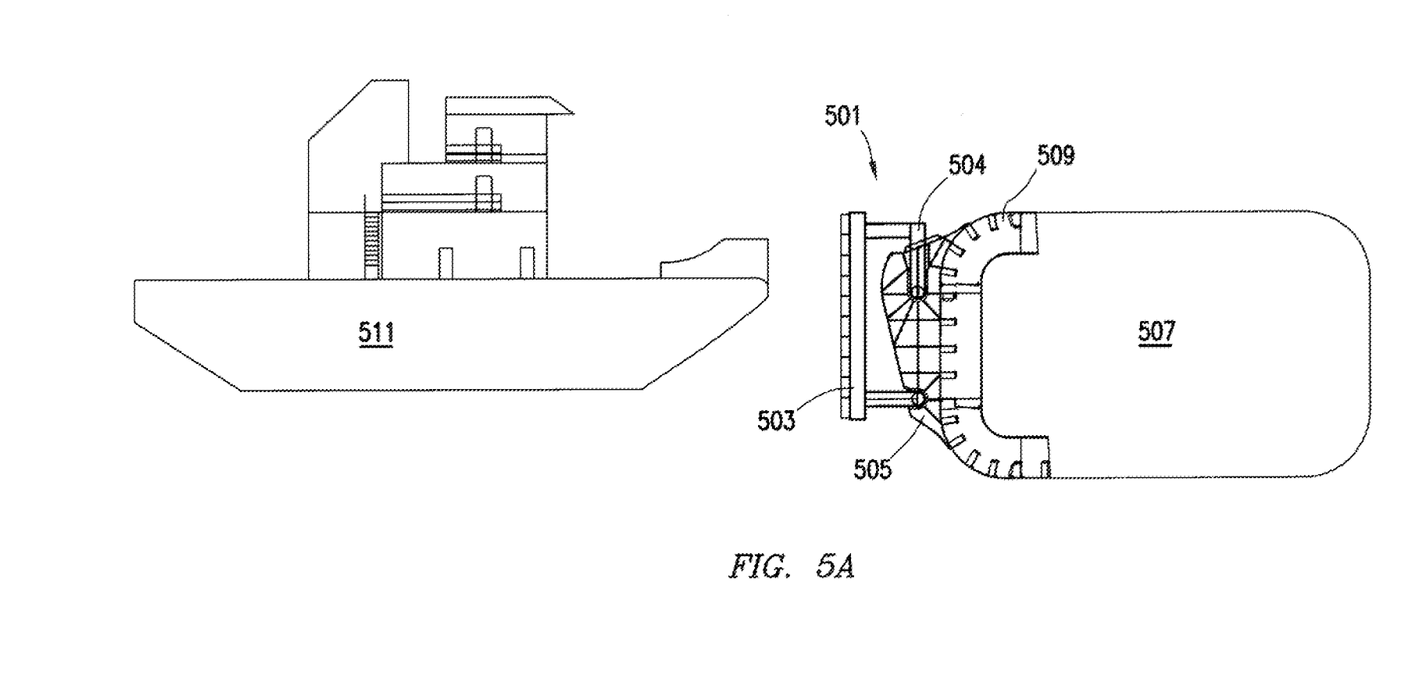
FIGS. 5A-5B show examples of attachment systems for use with an offshore vessel in accordance with one or more embodiments of the present disclosure.
Figure 5B:
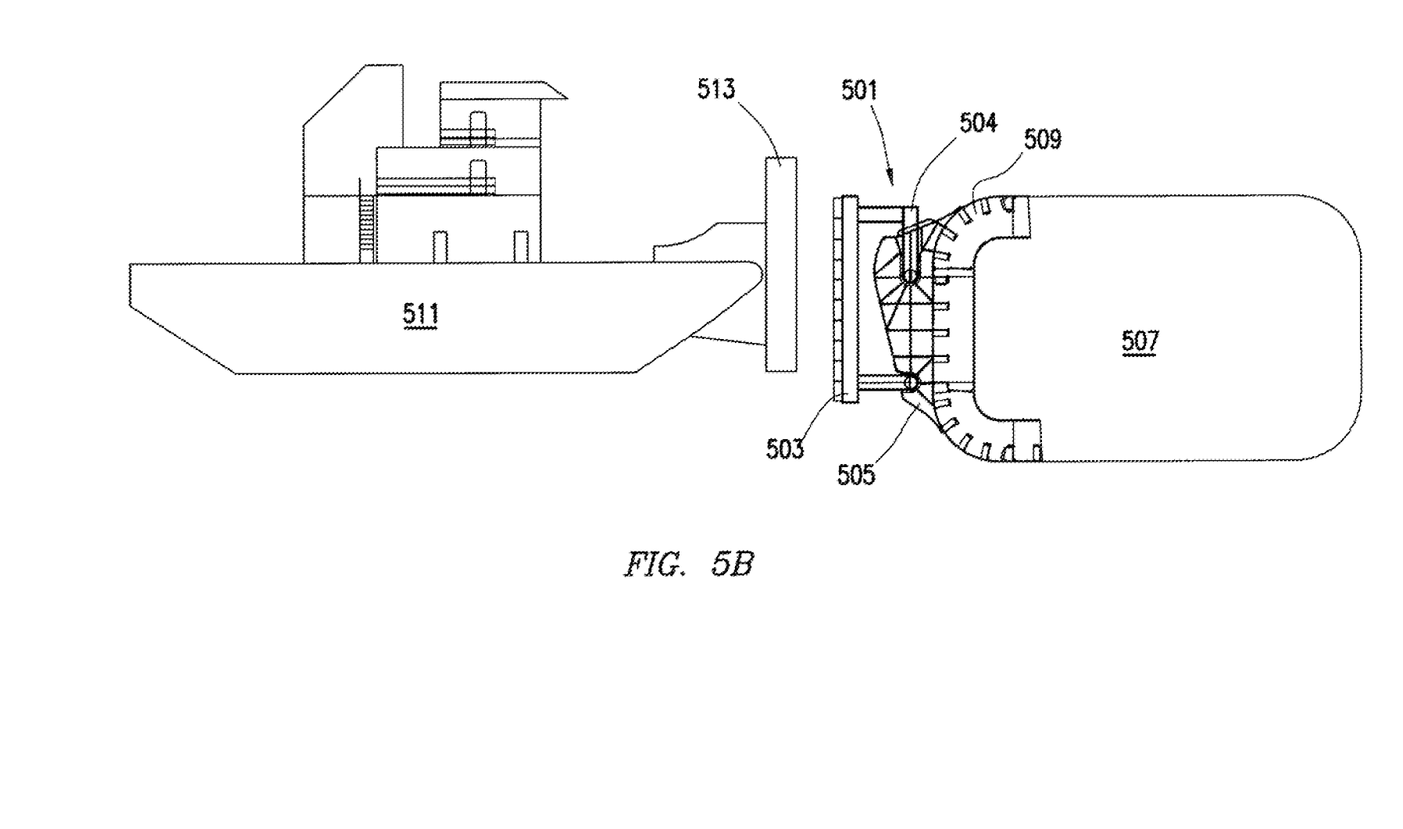

Referring now to FIGS. 5A-5B, an attachment system in accordance with one or more embodiments is shown. In FIGS. 5A-5B, an attachment system 501 includes an adaptor 503 and a porch 505. The porch 505 is shown affixed to a structure 507. In this example, the structure 507 includes supports 509 for supporting the attachment system 501. Supports 509 may include any of additional framing, such as web framing, additional surface support, such as a support shell, and or any internal or external support known in the art. In addition, the adaptor 503 includes one or more adaptor elements (e.g., a frame, lugs, or any other structural element known in the art) configured to support additional equipment. As shown, the adaptor 503 is configured to engage a vehicle 511. In this case, the vehicle 511 may be a tug boat or any other marine vessel known in the art. Alternatively, the vehicle 511 may be an onshore vehicle such as a truck. The vehicle 511 may engage the attachment system 501 and/or the adaptor 503 in order to move or stabilize the structure 507. In addition, as shown in FIG. 5B, the vehicle 511 may include a push plate 513 configured to engage with the adaptor 503 in order to move or stabilize the structure 507. Alternatively, or in addition, adaptor 503 may also include a push plate or other supporting member configured to engage with vehicle 511 and provide additional support and/or stability.

Using an attachment system as disclosed herein may be beneficial in moving a structure to a particular location. For example, affixing the porch 505 to the structure 507 and engaging the adaptor 503 with the porch 505 would allow for a vessel, such as a push tug 511, to move the structure about by engaging a portion of the push tug 511, such as push plate 513, with the adaptor 503.

Figure 6:
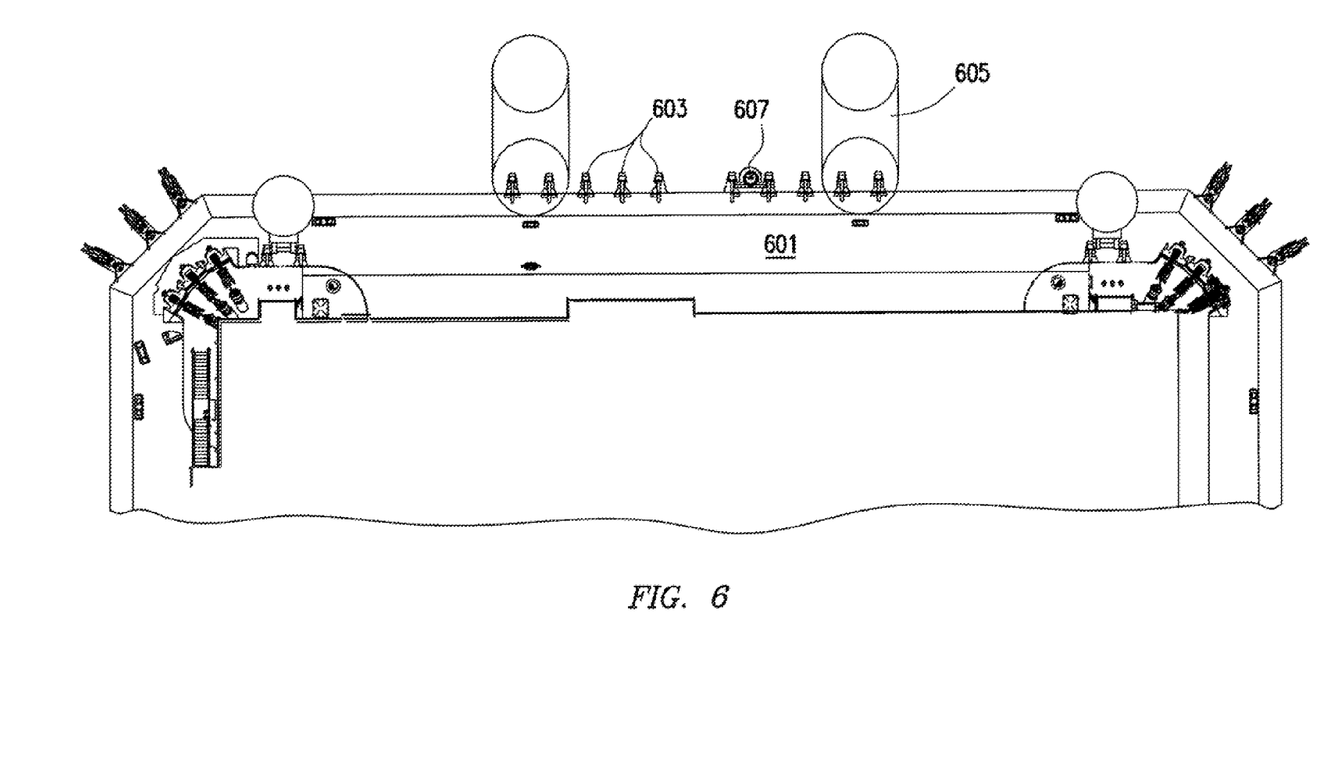
FIG. 6 illustrates a top view of one or more attachment systems in accordance with one or more embodiments of the present disclosure.

Referring now to FIG. 6, a view of one or more attachment systems in accordance with one or more embodiments is shown. As described above, any number of attachment systems may be used for a particular application or operation. In addition, any number of attachment systems may be used for a number of operations or applications. As shown in FIG. 6, a base structure 601 is shown having a plurality of attachment systems 603. One or more of the attachment systems 603 may be used to attach additional structures (e.g., support structure 605) and/or equipment (e.g., equipment device 607) to the base structure 601.

Figure 7A:
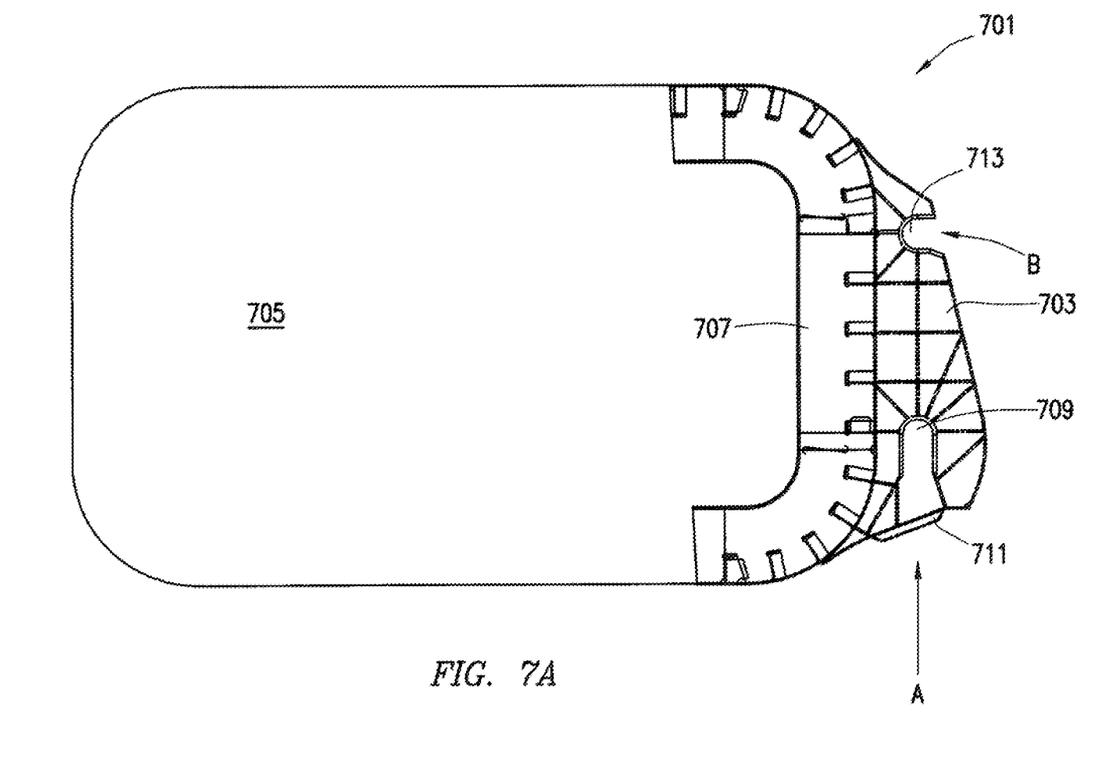
FIGS. 7A-7B show examples of attachment systems for use with an offshore vessel in accordance with one or more embodiments of the present disclosure.
Figure 7B:
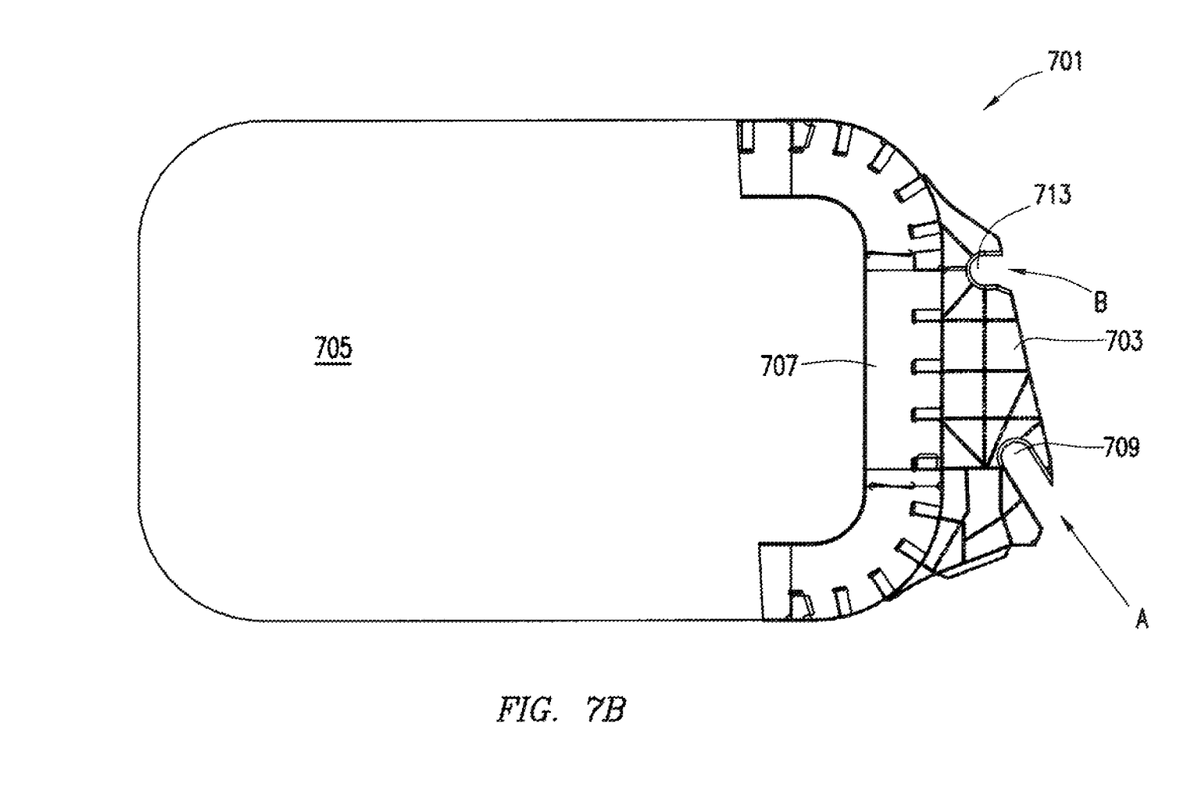

Referring now to FIGS. 7A-7B, views of an attachment system in accordance with one or more embodiments re shown. In FIG. 7A, an attachment system 701 includes an adaptor a porch 703. The porch 703 is shown affixed to a structure 705. In this example, the structure 705 includes supports 707 for supporting the attachment system 701. Supports 707 may include any of additional framing, such as web framing, additional surface support, such as a support shell, and or any internal or external support known in the art.

In one or more embodiments, the porch 703 may be configured to support an adaptor or other device (not shown). The porch 703 may be designed to engage with an adaptor by first engaging the adaptor with a lower socket 709. The adaptor may slide in the direction of arrow A into lower socket 709. In other embodiments, the porch 703 may be lowered onto an adaptor such that a portion of the adaptor engages with the lower socket 709. The adaptor may be secured in place using one or more latches 711.

Thereafter, in one or more embodiments, the adaptor may rotate to engage with an upper socket 713 of the porch 703. For example, the adaptor may rotate in the direction of arrow B to engage a portion of the adaptor with the upper socket 713. In some embodiments, the porch 703 and/or the structure 705 may be rotated to engage with a portion of the adaptor. For example, in one or more embodiments, the structure 705 may be a pontoon having buoyancy and a center of gravity that may be adjusted using known techniques in the art. By rotating and/or moving the structure 705 with respect to an adaptor, the adaptor may engage with upper socket 713 of the porch 703. Although not shown, one or more latches may be disposed near the upper socket 713 of the porch 703 to secure an adaptor into position.

Furthermore, as shown in FIG. 7B, an attachment system 701 includes an adaptor a porch 703. The porch 703 is shown affixed to a structure 705. In this example, the structure 705 includes supports 707 for supporting the attachment system 701. Supports 707 may include any of additional framing, such as web framing, additional surface support, such as a support shell, and or any internal or external support known in the art.

In one or more embodiments, the porch 703 may be configured to support an adaptor or other device (not shown). The porch 703 may be designed to engage with an adaptor by first engaging the adaptor with a lower socket 709. The adaptor may slide in the direction of arrow A into lower socket 709. In other embodiments, the porch 703 may be lowered onto an adaptor such that a portion of the adaptor engages with the lower socket 709. Additionally, the porch 703 and/or structure 705 may rotate and move in the direction of arrow A to engage an adaptor with the lower socket 709.

Thereafter, in one or more embodiments, the adaptor may rotate to engage with an upper socket 713 of the porch 703. For example, the adaptor may rotate in the direction of arrow B to engage a portion of the adaptor with the upper socket 713. In some embodiments, the porch 703 and/or the structure 705 may be rotated to engage with a portion of the adaptor. For example, in one or more embodiments, the structure 705 may be a pontoon having buoyancy and a center of gravity that may be adjusted using known techniques in the art. By rotating and/or moving the structure 705 with respect to an adaptor, the adaptor may engage with upper socket 713 of the porch 703. Although not shown, one or more latches may be disposed near the upper socket 713 of the porch 703 to secure an adaptor into position.

Those having ordinary skill in the art would know and although a few examples of the configuration and orientation of the attachment system and its components are described herein, many other arrangements and configurations and components may be considered without departing from the scope of the present disclosure. For example, the porch may include a number of lower sockets and a number of upper sockets. In addition, the porch may include additional supporting devices such as framing or latches to support and/or position an adaptor or other device. Furthermore, the porch may be designed to engage an adaptor or other device having multiple sockets in multiple directions. For example, the porch may include three or more sockets with which the adaptor may engage. Further, sockets of the porch may be oriented in any direction such that the adaptor may slide, rotate, or otherwise be positioned into place with respect to the porch.

In some embodiments, an adaptor may be positioned into engagement with a porch by engaging a portion of the adaptor (e.g., lugs of an adaptor) with a portion of the porch (e.g., sockets of a porch). Once engaged, the adaptor may be pulled, pushed, or otherwise moved and secured into place. For example, an adaptor may first engage with a porch. Thereafter, the adaptor may be pulled or pushed upward, downward, sideways, or any combination of the foregoing. When pulled, the adaptor may slide along sockets or other portions of the porch into a secured position. Once in a secure position, the adaptor may be latched or locked into place using one or more latches and/or locks.

In one or more embodiments, the adaptor may rotate with respect to the porch in order to be secured into engagement with the porch. For example, a portion of the adaptor may engage with one or more portions of the porch. Thereafter, the adaptor and/or the porch may be rotated to position the adaptor with respect to the porch. The adaptor may then be secured into place using latches, locks, or the like.

An attachment system in accordance with one or more embodiments of the present disclosure may be helpful in multiple areas, such as within the oil and gas industry. For example, an attachment system in accordance with one or more embodiments of the present disclosure may be used for additional support or may be used to connected additional equipment. Advantageously, the attachment system disclosed allows for quick and easy attachment and detachment of equipment or support structures. In addition, the attachment system may be used for rig expansion or reduction, as well as moving and/or stabilizing a structure. Further, attachment of one or more equipment devices to a structure may be done so efficiently and, in some cases, without requiring welding or a welded connection.

As discussed herein, equipment may include, but not limited to, support columns, risers, drill strings, pipelines, mooring points, flow lines, I-tubes, and/or any other equipment known in the art. Additionally, as discussed herein, structures may include, but not limited to, pontoons, columns, frames, structural members such as beams, brackets, shells, and/or any other structures known in the art.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. An attachment system for an offshore structure, the attachment system comprising:
   a porch having at least two plates, the porch configured to be affixed to the offshore structure, each plate comprising an upper socket, a lower socket, and a latch; and
   an adaptor configured to engage with one or more plates of the porch, the adaptor comprising a pair of upper lugs configured to engage with the upper sockets and a pair of lower lugs configured to engage with the lower sockets, wherein the latch retains the adaptor into engagement with the at least two plates, wherein the adaptor is configured to support an equipment device.

2. The attachment system of claim 1, wherein the at least two plates are side plates.

3. The attachment system of claim 1, wherein the upper socket on a first plate of the at least two plates is disposed on an interior face of the first plate.

4. The attachment system of claim 1, wherein the at least two plates are connected to each other to form a single plate structure.

5. The attachment system of claim 1, wherein the adaptor is capable of being disengaged from the porch.

6. An oilfield structure comprising:
a base having one or more base support members disposed thereon;
an attachment system comprising a porch and an adaptor, the porch comprising at least two plates, each plate comprising an upper socket and a lower socket, wherein the upper socket and the lower socket of each plate are oriented to engage with the adaptor; and
an equipment device removably connected to the adaptor of the attachment system,
wherein the porch is affixed to the base.

7. The structure of claim 6, wherein the oilfield structure is a semisubmersible.

8. The structure of claim 7, wherein the base is a pontoon base.

9. The structure of claim 6, wherein the equipment device comprises an additional support column configured to support at least one of a deck, an extension of a deck, and additional equipment devices.

10. The structure of claim 6, wherein the porch is rotatable and the adaptor is rotatable.

11. The structure of claim 6, wherein the equipment device comprises a push plate configured to engage with a vehicle capable of moving the structure.

12. The structure of claim 11, wherein the vehicle is a push tug.

13. A method of attaching an equipment device to an offshore structure, the method comprising:
affixing a porch of an attachment system to the offshore structure, the porch comprising at least two plates, each plate comprising an upper socket, a lower socket, and a latch;
engaging an adaptor with the at least two plates of the porch, the engaging comprising:
engaging a pair of upper lugs on the adaptor with the upper sockets;
engaging a pair of lower lugs on the adaptor with the lower sockets; and
attaching an equipment device to the adaptor.

14. The method of claim 13, further comprising latching a latch to retain the adaptor into engagement with the one or more plates a push plate.

15. The method of claim 13, wherein the equipment device comprises a push plate configured to engage with a vessel capable of moving the semisubmersible.

16. The method of claim 13, wherein the equipment device comprises a structural member, wherein the structural member comprises at least one selected from the group consisting of a support column, a web frame, a shell, and a stiffening bracket.

17. The method of claim 13, wherein the equipment device comprises at least one selected from the group consisting of a riser, a mooring point, a pipeline, a flow line, and an I-tube.

18. The method of claim 13, wherein the offshore structure is at least one selected from the group consisting of a pontoon structure and a support column.

19. The method of claim 13, wherein affixing the porch to the offshore structure comprises affixing the plates to the structure.

20. The method of claim 13, wherein affixing the porch to the offshore structure comprises integrating the plates into the structure.

21. The method of claim 13, wherein engaging the pair of upper lugs on the adaptor with the upper sockets further comprises rotating the adaptor prior to engaging the pair of lower lugs with the lower sockets.

22. The method of claim 13, wherein engaging the pair of lower lugs on the adaptor with the lower sockets further comprises rotating the adaptor prior to engaging the pair of upper lugs with the upper sockets.

23. The method of claim 13, wherein attaching the equipment device to the adaptor further comprises orienting the equipment device in any direction.

24. The method of claim 13 wherein attaching an equipment device to an offshore structure further comprises:
affixing a second porch of a second attachment system to the offshore structure, the second porch comprising at least two plates, each plate comprising an upper socket, a lower socket, and a latch;
engaging a second adaptor with the at least two plates of the second porch, the engaging comprising:
engaging a pair of upper lugs on the second adaptor with the upper sockets of the second porch;
engaging a pair of lower lugs on the second adaptor with the lower sockets of the second porch; and
attaching an equipment device to the second adaptor.

* * * * *